US011295068B2

(12) United States Patent
Henvy

(10) Patent No.: US 11,295,068 B2
(45) Date of Patent: Apr. 5, 2022

(54) TECHNIQUES AND ARCHITECTURES FOR NATIVE DATA FIELD LIFECYCLE MANAGEMENT

(71) Applicant: salesforce.com, inc., San Francisco, CA (US)

(72) Inventor: Kelly Henvy, Salem, OR (US)

(73) Assignee: salesforce.com, Inc., San Francisco, CA (US)

( * ) Notice: Subject to any disclaimer, the term of this patent is extended or adjusted under 35 U.S.C. 154(b) by 508 days.

(21) Appl. No.: 15/631,250

(22) Filed: Jun. 23, 2017

(65) Prior Publication Data

US 2018/0373684 A1  Dec. 27, 2018

(51) Int. Cl.
*G06F 16/907* (2019.01)
*G06F 40/157* (2020.01)
*G06F 16/23* (2019.01)

(52) U.S. Cl.
CPC ........ *G06F 40/157* (2020.01); *G06F 16/2358* (2019.01); *G06F 16/907* (2019.01)

(58) Field of Classification Search
CPC .. G06F 17/2276; G06F 16/2358; G06F 16/90; G06F 17/30; G06F 16/907
USPC ........................................................ 707/695
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |

(Continued)

OTHER PUBLICATIONS

Notice of Allowance for U.S. Appl. No. 15/164,781 dated Jul. 3, 2018, 14 pages.

(Continued)

*Primary Examiner* — Hosain T Alam
*Assistant Examiner* — Tracy M McGhee
(74) *Attorney, Agent, or Firm* — Kwan & Olynick LLP

(57) ABSTRACT

Techniques for maintaining a data dictionary within a computing platform that provides a multitenant environment in which multiple tenants utilizing the multitenant environment share a single instance of a database. The data dictionary is maintained with referential integrity utilizing custom database objects to provide metadata corresponding to the data dictionary. The data dictionary tracks attributes for the custom database objects utilizing natively supported field attributes and the custom database objects maintain tenant-specific information. The custom database objects are automatically updated corresponding to the data dictionary. A notification to one or more users is generated for custom database objects that correspond to the data dictionary that cannot be updated automatically, if any.

20 Claims, 7 Drawing Sheets

(56) References Cited

U.S. PATENT DOCUMENTS

| | | |
|---|---|---|
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0179956 A1 | 8/2007 | Whitmyer |
| 2009/0177744 A1 | 7/2009 | Marlow et al. |
| 2011/0276674 A1* | 11/2011 | Jensen-Horne ....... G06F 9/5061 709/223 |
| 2011/0296380 A1 | 12/2011 | Dvinov et al. |
| 2013/0036110 A1 | 2/2013 | Scott et al. |
| 2013/0117291 A1 | 5/2013 | Roy-Faderman |
| 2013/0304713 A1 | 11/2013 | Roy-Faderman |
| 2014/0006441 A1 | 1/2014 | Torman et al. |
| 2014/0195644 A1 | 7/2014 | Marin et al. |
| 2015/0317350 A1 | 11/2015 | Roy-Faderman |
| 2016/0048844 A1* | 2/2016 | Vogt, Jr ............... G06Q 30/018 705/317 |

OTHER PUBLICATIONS

Non-Final Office Action for U.S. Appl. No. 15/164,781 dated Jan. 16, 2018, 15 pages.
Final Office Action for U.S. Appl. No. 15/445,625 dated Jun. 7, 2019, 11 pages.
Non-Final Office Action for U.S. Appl. No. 15/445,625 dated Sep. 4, 2019, 14 pages.
Notice of Allowance for U.S. Appl. No. 16/174,111 dated Oct. 30, 2019, 15 pages.
Notice of Allowance for U.S. Appl. No. 16/813,719 dated May 19, 2021, 15 pages.

* cited by examiner

| | Field Label | Installed Package | Standard/Custom | Data Type | Track History | Fill Rate (7/1) | Definition/Description | Business Owner(s) | Field Status |
|---|---|---|---|---|---|---|---|---|---|
| 77 | Current Partner Account Id | | Custom | Formula (Text) | | 100.00% | Created in 2009, formula - Id | Shannon | Deprecate Candidate |
| 78 | | | | | | | Whitespace is now tracked EBU - Elevate Growth Plan, CBU/Other = offline in google sheets. Fields are obsolete until a new whitespace process can be defined and automated to meet goals of entire organization on how to implement this methodology. Project request has been submitted to GTO ops intake (if not needed on sales layouts); Avail on the Account Plan Page (custom Button) | | |
| 79 | Current SFA System | | Custom | Picklist | | 0.00% | | | Deprecate Candidate |
| 80 | CustomerModifiedDate | | Custom | Date/Time | | 94.00% | Updates to (NOW) when one of many fields is updated | Tacy CSN | |
| 81 | Customer Priority | Apttus Configuration & Pricing | Custom | Picklist | | | Apttus | | Deprecate Candidate |
| | D&B Account Number | | Custom | Text (SD) | | 0.24% | This is the number that D&B assigns to each customer. | Simone | |
| 82 | Data.com AOV | | Custom | Number (11, 2) | | 0.45% | Calculates active Data.com recurring spend at the exact dollar value | Mitchell | Active |
| 83 | Data.com AOV Band | | Custom | Formula (Text) | | 100.00% | Segmentation of Data.com customer's AOV based upon customer engagement model for CSG | Mitchell | Active |
| 84 | Data.com First Active Date | | Custom | Date | | 0.49% | Indicates the first active date of recurring Data.com product. | Mitchell | Active |

FIG. 1

Account Custom Field
Duplicate Status
Back to Account Fields

Help for this Page (?)

Validation Rules [0]

Fill Rate: ——————— } 230
Field Status: ———————

Custom Field Definition Detail

[ View Field Accessibility ]

Field Information

| | | Security: ——————— } 240 | |
|---|---|---|---|
| Field Label | Duplicate Status | Object Name | Account |
| Owner | | | |
| Field Name | Duplicate_Status | Data Type | Picklist |
| API Name | Duplicate_Status_c | | |
| Description | If Duplicate, this account should be merged. If Legitimate duplicate, this record cannot be merged and "do not merge" should also = true. (case #03249388) | | |
| Help Text | Used for data quality measurement of duplicate record in Org. | | |
| Created By | Susan 8/25/2015 11:55 AM | Modified By | Susan 8/25/2015 11:55 AM |

FIG. 2

SETUP> OBJECT MANAGER
Account

Fields & Relationships (812)   Record Types (9)         Page Layouts (32)
Related Lookup Filters (15)    Compact Layouts (3)      Buttons, Links, and Actions (12A)
Validation Rules (33)          Search Layouts (7)       Object Limits (11)

🔍 Find in Page   Create ▼

˅ Details
320 — Data Steward: Name
     API Name   Account
     Singular Label   Account          Custom
     Plural Label   Account Help Settings     Standard Salesforce.com Help

˅ Fields & Relationships (812)

| FIELD LABEL | FIELD NAME | DATA TYPE |
|---|---|---|
| # Active Data Migrations | #Active_Data_Migrations_c | Roll-up Summary (COUNT Data Migration) |
| # certified individuals | #certified_individuals_c | Number(18, 0) |
| # Employee Licenses | # Employee_Licenses_c | Formula (Number) |

SETUP > OBJECT MANAGER
Account

Fields & Relationships (814)         Record Types (9)              Page Layouts (32)
Related Lookup Filters (15)          Compact Layouts (3)           Buttons, Links, and Actions (124)
Validation Rules (33)                Search Layouts (7)            Object Limits (11)

Q Find in Page     Create ▼

∨ Details

API Name        Account
Singular Label  Account              Custom
Plural Lable    Account              Help Settings    Standard Salesforce.com Help ∨ Fields & Relationships (814)

| FIELD LABEL | FIELD NAME | DATA TYPE | DESCRIPTION | BUSINESS OWNER |
|---|---|---|---|---|
| # Active Data Migrations | Active_Data_Migrations_c | Roll-up Summary | Used by Data Quality operations to stage customer account data that | ▶ |
| # certified individuals | certified_individuals_c | Number(18, 0) | | ▶ |
| # Employee Licenses | Employee_Licenses_c | Formula (Number | | ▶ |

Account Limits

Setup>Customize>Accounts>Limits

These limits apply to the setup of this object in your organization. Some limits may vary by object. For a complete list of system limits, see Editions and Limits.

⚠ You're approaching or have exceeded one or more limits on this object.

∨ Object Limits

| Item | Usage | Limit | % used | Message |
|---|---|---|---|---|
| Custom Fields | 445 | 500 | 89% | You're nearing... |
| Rollup Summary Fields | 10 | 25 | 40% | |
| Custom Relationship Fields | 33 | 40 | 62% | You're nearin... |
| Active Workflow Rules | 49 | 300 | 16% | |
| Total Workflow Rules | 50 | 500 | 10% | |
| Approval Processes | 0 | 500 | 0% | |
| Active Lookup Filters | 4 | 5 | 80% | You're nearin... |
| Active Validation Rules | 26 | 100 | 26% | |
| VLOOKUP Functions | 0 | 10 | 0% | |
| Sharing Rules (Both Owner-and Criteria-based) | 14 | 550 | 3% | |
| Sharing Rules (Criteria-based Only) | 1 | 10 | 2% | |

515 520 525 530

510

Help for this Page ⊙

Setup Home
????? ?????
  Users
  Data
  Email
????? ?????
  Apps
  Objects and Fields
  Objects Manager
  Process Automation
  User Interface
  Custom Code
  Environments

560

∨ Object Limits (11)

| ITEM | USAGE | LIMIT | % USED | MESSAGE |
|---|---|---|---|---|
| Custom Fields | 445 | 500 | 89% | You're nearing limit -Cleanup or workarounds may be necessary to avoid exceeding the limit |
| Rollup Summary Fields | 10 | 25 | 40% | |
| Custom Relationship Fields | 33 | 40 | 82% | You're nearing limit -Cleanup or workarounds may be necessary to avoid exceeding the limit |
| Active Workflow Rules | 49 | 300 | 16% | |
| Total Workflow Rules | 50 | 500 | 10% | |
| Approval Process | 0 | 500 | 0% | |
| Active Lookup Filters | 4 | 5 | 80% | You're nearing limit -Cleanup or workarounds may be necessary to avoid exceeding the limit |
| Active Validation Rules | 26 | 100 | 26% | |
| VLOOKUP Functions | 0 | 10 | 0% | |

TECHNIQUES AND ARCHITECTURES FOR NATIVE DATA FIELD LIFECYCLE MANAGEMENT

TECHNICAL FIELD

Embodiments relate to electronic data governance. More particularly, embodiments relate to techniques for efficiently managing data dictionaries and related metadata in complex environments.

BACKGROUND

When individuals/organizations/multitenant clients have large amounts of data, it is common for the management of that data to be complex and to be handled by multiple people. Further, inconsistent policies may be applied to data management/governance that may result in confusing, useless, stale, conflicting data. Data dictionaries are used to provide a central, accessible and reliable reference for metadata and other useful information. One basic approach to managing a data dictionary is to use a spreadsheet or other similar tool. However, as data repositories grow in size and complexity current techniques for managing data dictionaries become inefficient.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 1 is a simple example data dictionary that can be managed utilizing the techniques described herein.

FIG. 2 is one embodiment of a graphical user interface that can be used to utilize attribute features as described herein.

FIG. 3 is one embodiment of a graphical user interface that can be used to manage objects having attribute features as described herein.

FIG. 4 is one embodiment of a graphical user interface that can be used to manage objects having attribute features as described herein.

FIG. 5 is one embodiment of two alternative graphical user interfaces in which a user can access reports for object usage.

DETAILED DESCRIPTION

Figure 6:
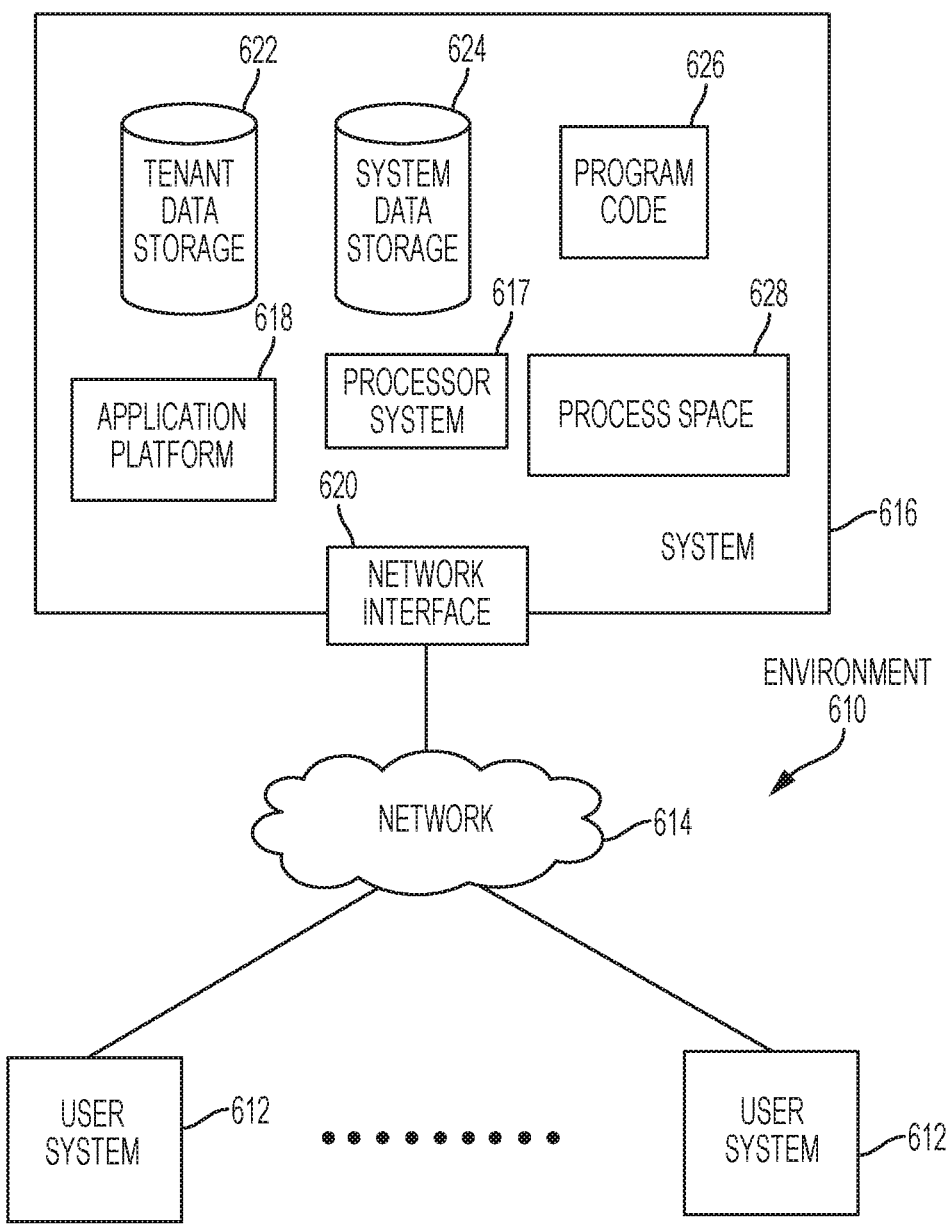
FIG. 6 illustrates a block diagram of an environment where an on-demand database service might be used.

In the following description, numerous specific details are set forth. However, embodiments of the invention may be practiced without these specific details. In other instances, well-known structures and techniques have not been shown in detail in order not to obscure the understanding of this description.

Conventionally, metadata has been used to describe data. The metadata, in some circumstances, can describe a format of the data, a type of the data, etc. However, techniques for defining metadata have generally exhibited various limitations. For example, the metadata itself has typically been incapable of being described by other metadata in a standard manner made available to third party developers of a platform maintaining the metadata. Various embodiments described herein overcome these deficiencies and can be utilized to, for example, manage a data dictionary in a more efficient and effective manner than was previously possible.

A data dictionary is a central, accessible and reliable reference that can function to increase transparency, drive data quality and/or process standards. For example, the data dictionary can be utilized to identify owners of fields/data, obtain definitions, share and align fields/data across record types (or teams), consolidate duplicates, establish deprecate candidates and/or track field status through deletion.

Techniques and architectures described herein can provide efficient native solutions for managing a data dictionary. These techniques and architectures can be applied to, for example, managing personally identifiable information (PII) that is managed within a database environment. Various political jurisdictions (e.g., United States, European Union) can have their own data residency laws and requirements related to PII. These laws and requirements can control how/what data is used (including movement of data) and how/what data should be protected. For example, the European Union has privacy laws relating to PII. Entities that store and utilize data must comply with these laws and requirements.

As used herein a "field" is data that describes a characteristic corresponding to an object that can be stored in a database. Fields can be used in various ways to manage objects in a computing environment utilizing the corresponding objects. Fields have associated attributes (e.g., field label, field type, field length). In one embodiment, objects can have associated standard fields that exist for all objects, and the objects can also have custom fields that associate additional attributes for that specific object. The data dictionaries described herein can be used to manage both standard and custom fields.

Custom objects and fields allow a user to tailor which data is stored to fit individual needs. In a multitenant environment, for example, this can allow each tenant/organization/customer to customize data to the needs of the tenant/organization/customer. In various embodiments, standard objects can be provided with associated standard fields that can be customized by a user to customize how the data in the object is used, reported, stored, tracked, etc.

Custom objects provide the flexibility to store any type of data that is relevant to an organization's operation. For example, when building a recruiting app, custom objects corresponding to Position and Candidate can be created to track information on job openings and candidates.

Custom fields can provide a further level of granularity for categorizing and tracking data. Like standard objects, custom objects have fields that define the data for the object records. Continuing the recruiting app example from above, custom number field for "years of experience" can be added to the custom Candidate object or a custom text field "description" can be added to the custom Position object. Thus, addition of custom objects and fields can quickly increase the complexity of data governance.

In general, the use of "native" in this context refers to what is provided "out of the box" by a platform in which the objects and fields to be managed are provided. The value of this is that the native support functionality will be part of the product that subscribers have been using/purchased, and provides a way to store data management/governance attributes on the fields/objects themselves. Thus, the techniques and architectures described herein can provide a built-in data dictionary when creating the metadata. This results in and more efficient environment that is easier to use for the end users, administrators and developers.

FIG. 1 is a simple example data dictionary that can be managed utilizing the techniques described herein. Various embodiments of on-demand services environments that can utilize the techniques described herein are described in greater detail below.

In the example of FIG. 1, the Field Label describes how the field is displayed in areas such as record details, search results and lists (e.g., "Current Partner Account Id"). Installed Package provides a name of a package that a corresponding field belongs to, if any. Standard/Custom indicates whether the corresponding field is a standard field or is a custom field (e.g., created by a specific tenant/organization). The Data Type indicates the data type (e.g., number, picklist, text).

The Fill Rate indicates the percent of total records in which the field has been used. The Definition/Description indicates how the corresponding field is populated and used. The Business Owner(s) indicates names of one or more people responsible for the field. The Field Status indicates the current status of the corresponding field (e.g., Active, Inactive, Unknown). Additional and/or different attributes can also be supported/provided in other embodiments.

In one embodiment, the data dictionary as described herein resides within the same service environment as the data being managed. For example, in multitenant on-demand services environments the data dictionary is stored and maintained within an environment (e.g., production environment, test environment) belonging to the organization/tenant that owns the data managed by the data dictionary.

A tenant includes a group of users who share a common access with specific privileges to a software instance. A multi-tenant architecture provides a tenant with a dedicated share of the software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

In addition to the fields listed above, additional and/or different fields can also be supported. These additional and/or different fields can include, for example, multiple date fields (e.g., date last viewed, last confirmed use), a date that a field was pulled from page layouts, work flows, reports, a date that a field was archived and the field deleted. Metadata about how a field is used can be maintained.

In one embodiment, each of the fields managed and/or monitored can be utilized for data governance reasons, but they can be individually managed and/or monitored. This allows, for example, fields to be individually maintained and deprecated (when appropriate) using the structures described herein.

In various embodiments, this allows security to be provided/enforced based on field classifications. This can allow, for example, access to be managed at a field level based on user profiles. This field-level security functionality can be useful to provide, for example, management of PIT or other sensitive data in a more granular and efficient manner than was previously possible.

In various embodiments, to provide field level control and efficient data governance, one or more of the following attributes can be associated with each field to be provided: business (or data) owner, fill rate, status, security and/or other relevant information. In one embodiment, any configuration operations to be performed are performed at the platform administrator level; however, other levels can also be supported.

FIG. 2 is one embodiment of a graphical user interface that can be used to utilize attribute features as described herein. The example of FIG. 2 is for a custom field named "Duplicate Status" and the techniques and uses of the attributes described are applicable to other types of fields as well.

In one embodiment, interface window 200 allows a user to see and modify attribute information for custom fields within standard or custom database objects. The attributes are provided as native elements of the database object. Window 200 can include the name of the custom field for which attributes are displayed, 210. Contextual information can also be displayed.

Various attributes, for example, the attributes discussed above can be included within window 200. The locations and layouts of FIG. 2 are merely examples and other configurations can also be supported. In the example of FIG. 2, Fill Rate and Field Status (230) can be displayed within window 200. These attributes can be utilized to determine the usage of the corresponding custom field.

In one embodiment, custom field definition 220 includes attributes discussed above including, for example, owner name 250 and/or security classification 240. As discussed above, additional and/or different attributes can also be maintained.

FIG. 3 is one embodiment of a graphical user interface that can be used to manage objects having attribute features as described herein. The example of FIG. 3 is for a standard object named "Account" and the techniques and uses of the attributes described are applicable to other types of objects as well.

In the example of FIG. 3, the object has an associated attribute for a data owner (or data steward), 320. Similar to the field attributes discussed above, the data steward attribute can be utilized to support life cycle management for objects. In the example of FIG. 3, window 300 can be utilized to provide attribute information for the account object.

FIG. 4 is one embodiment of a graphical user interface that can be used to manage objects having attribute features as described herein. The example of FIG. 4, window 400 is for a standard object named "Account" and the techniques and uses of the attributes described are applicable to other types of objects as well. In the embodiment of FIG. 4, each field of the object (e.g., Account) has a native attribute for business owner (410). Thus, the person responsible for the field and/or the contents of the field can be identified for lifecycle management (and other) purposes.

FIG. 5 is one embodiment of two alternative graphical user interfaces in which a user can access reports for object usage. The example of FIG. 5 is directed to managing object limits; however, the concept of using native attributes to manage object characteristics can be applied to other native attributes as well.

Window 500 provides an account level report for limits corresponding to various objects (e.g., custom fields, total workflow rules, active lookup filters, sharing rules), 510. In one embodiment, existing object limits can be supported as reportable attributes that can be used to build dashboards, processes, notifications, etc. These reports can be utilized to support data governance functionality.

In one embodiment, the report can include usage information 515 (for example, as a column in the report), limit information 520 (for example, as a column in the report), a percentage used 525 (for example, as a column in the report), and/or messages corresponding to the objects 530 (for example, as a column in the report).

Window 550 provides an account level object manager format for limits corresponding to various objects (e.g., custom fields, total workflow rules, active lookup filters, sharing rules), 560. In one embodiment, existing object limits can be supported as reportable attributes that can be used to build dashboards, processes, notifications, etc. These reports can be utilized to support data governance functionality.

In one embodiment, the report can include usage information 565 (for example, as a column in the report), limit information 570 (for example, as a column in the report), a percentage used 575 (for example, as a column in the report), and/or messages corresponding to the objects 580 (for example, as a column in the report).

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in herein FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Edge from Microsoft, Safari from Apple, Chrome from Google, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Core series processor or the like. Similarly, system 616 (and additional instances of an MTS, where more than one is present) and all of their components might be operator configurable using application(s) including computer code to run using a central processing unit such as processor system 617, which may include an Intel Core series processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
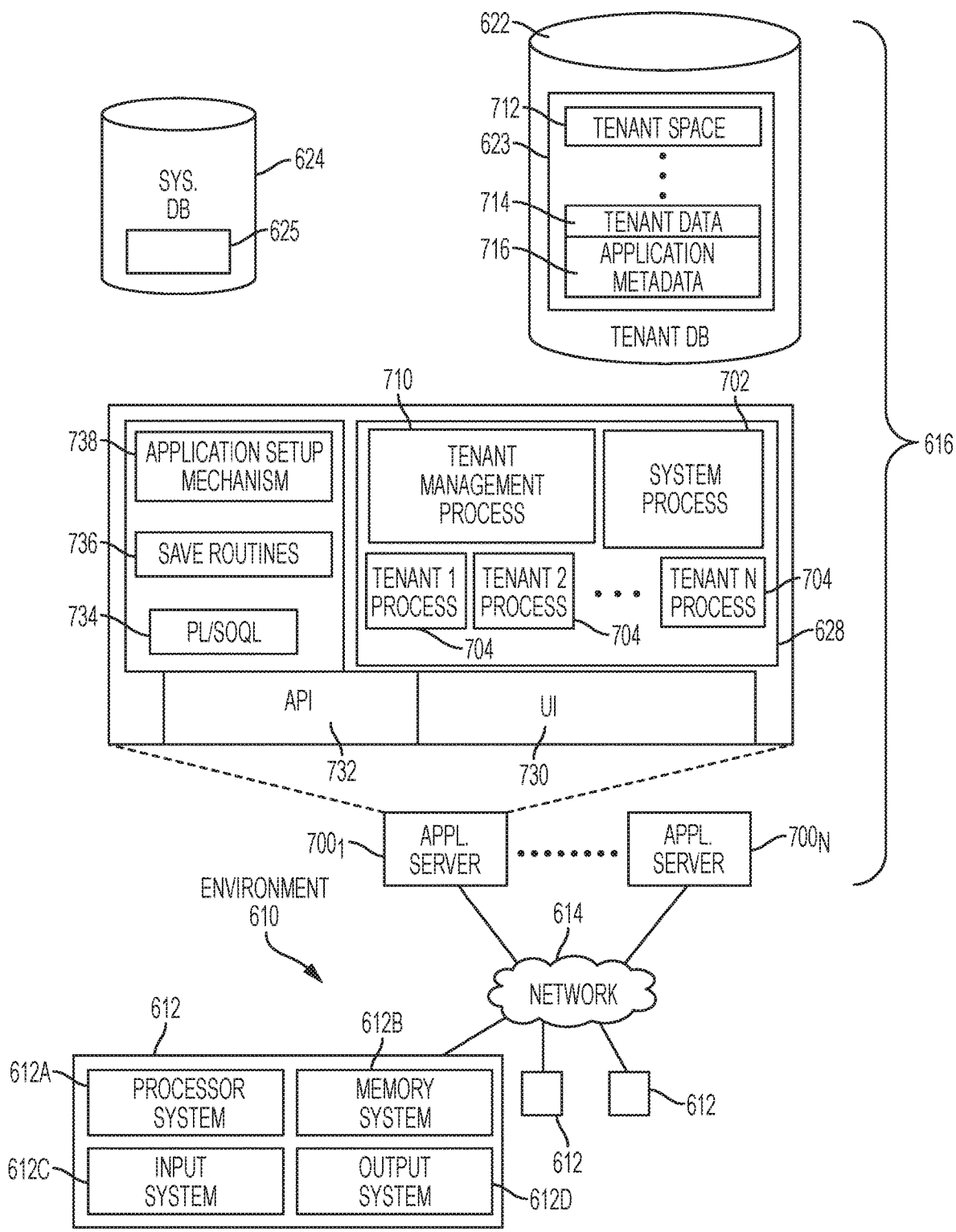
FIG. 7 illustrates a block diagram of an environment where an on-demand database service might be used.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 BIG-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A non-transitory computer-readable medium having stored thereon instructions that when executed by one or more processors, are configurable to cause the one or more processors to maintain a data dictionary within a computing platform that provides a multitenant environment in which multiple tenants utilizing the multitenant environment share a single instance of a database, the one or more processors to:

maintain, in the data dictionary and with referential integrity in an environment belonging to a tenant owning data managed by the data dictionary, one or more custom database objects to provide metadata corresponding to the data dictionary, wherein the data dictionary tracks attributes for the custom database objects utilizing natively supported field attributes and the custom database objects maintain tenant-specific information, wherein the data dictionary identifies owners of fields and aligns fields across record types, and the fields are individually managed and provide field-level security, further wherein the fields provide data that describes one or more characteristics corresponding to objects stored in the database where standard fields exist for all objects of a particular type and custom fields associated with the object of the particular type provide additional attributes;

update, automatically in response to a field change, attribute information within the data dictionary corresponding to custom fields in either standard database objects or custom database objects;

provide data security at the field level by at least managing access at the field level based on user profile information; and generate a notification to one or more users for one or more custom database objects that correspond to the data dictionary that cannot be updated automatically, if any, via a graphical user interface.

2. The non-transitory computer-readable medium of claim 1 wherein the custom database object comprises a fill rate indicates the percent of total records in which the field has been used.

3. The non-transitory computer-readable medium of claim 1 wherein the custom database object comprises an indication of one or more people responsible for the field.

4. The non-transitory computer-readable medium of claim 1 wherein the custom database object comprises an indication of a current status of the corresponding field.

5. The non-transitory computer-readable medium of claim 1 wherein the custom database object is created based on information received via a graphical user interface.

6. A method for maintaining a data dictionary within a computing platform that provides a multitenant environment in which multiple tenants utilizing the multitenant environment share a single instance of a database, the method comprising:

maintaining, in the data dictionary and with referential integrity in an environment belonging to a tenant owning data managed by the data dictionary, one or more custom database objects to provide metadata corresponding to the data dictionary, wherein the data dictionary tracks attributes for the custom database objects utilizing natively supported field attributes and the custom database objects maintain tenant-specific information, wherein the data dictionary identifies owners of fields and aligns fields across record types, and the fields are individually managed and provide field-level security, further wherein the fields provide data that describes one or more characteristics corresponding to objects stored in the database where standard fields exist for all objects of a particular type and custom fields associated with the object of the particular type provide additional attributes;

updating, automatically in response to a field change, attribute information within the data dictionary corresponding to custom fields in either standard database objects or custom database objects;

provide data security at the field level by at least managing access at the field level based on user profile information; and generating a notification to one or more users for one or more custom database objects that correspond to the data dictionary that cannot be updated automatically, if any, via a graphical user interface.

7. The method of claim 6 wherein the custom database object comprises a fill rate indicates the percent of total records in which the field has been used.

8. The method of claim 6 wherein the custom database object comprises an indication of one or more people responsible for the field.

9. The method of claim 6 wherein the custom database object comprises an indication of a current status of the corresponding field.

10. The method of claim 6 wherein the custom database object is created based on information received via a graphical user interface.

11. A system comprising:
a memory device;
one or more hardware processors coupled with the memory device one or more processors configurable to maintain a data dictionary within a computing platform that provides a multitenant environment in which multiple tenants utilizing the multitenant environment share a single instance of a database, the one or more processors to maintain, in the data dictionary and with referential integrity in an environment belonging to a tenant owning data managed by the data dictionary, one or more custom database objects to provide metadata corresponding to the data dictionary, wherein the data dictionary tracks attributes for the custom database objects utilizing natively supported field attributes and the custom database objects maintain tenant-specific information, wherein the data dictionary identifies owners of fields and aligns fields across record types, and the fields are individually managed and provide field-level security, further wherein the fields provide data that describes one or more characteristics corresponding to objects stored in the database where standard fields exist for all objects of a particular type and custom fields associated with the object of the particular type provide additional attributes, to update, automatically in response to a field change, attribute information within the data dictionary corresponding to custom fields in either standard database objects or custom database objects, and to generate a notification to one or more users for one or more custom database objects that correspond to the data dictionary that cannot be updated automatically, if any, via a graphical user interface.

12. The system of claim 11 wherein the custom database object comprises a fill rate indicates the percent of total records in which the field has been used.

13. The system of claim 11 wherein the custom database object comprises an indication of one or more people responsible for the field.

14. The system of claim 11 wherein the custom database object comprises an indication of a current status of the corresponding field.

15. The system of claim 11 wherein the custom database object is created based on information received via a graphical user interface.

16. The non-transitory computer-readable medium of claim 1 wherein the data dictionary is utilized to manage personally identifiable information (PII) within the database environment.

17. The non-transitory computer-readable medium of claim 16 wherein the PII is utilized to manage field-level security functionality.

18. The method of claim 6 wherein the data dictionary is utilized to manage personally identifiable information (PII) within the database environment.

19. The system of claim 11 wherein the data dictionary is utilized to manage personally identifiable information (PII) within the database environment.

20. The system of claim 19 wherein the PII is utilized to manage field-level security functionality.

* * * * *